(12) United States Patent
Inoue et al.

(10) Patent No.: US 11,072,667 B2
(45) Date of Patent: Jul. 27, 2021

(54) POLYROTAXANE HAVING SUBSTITUENT HAVING POLYALKYLENE OXIDE CHAIN OR DERIVATIVE THEREOF IN CYCLIC MOLECULE, AND METHOD FOR PRODUCING SAID POLYROTAXANE

(71) Applicant: ASM INC., Chiba (JP)

(72) Inventors: Katsunari Inoue, Kashiwa (JP); Masabumi Kudoh, Kashiwa (JP)

(73) Assignee: ASM INC., Chiba (JP)

( * ) Notice: Subject to any disclaimer, the term of this patent is extended or adjusted under 35 U.S.C. 154(b) by 0 days.

(21) Appl. No.: 16/619,052

(22) PCT Filed: Jun. 5, 2018

(86) PCT No.: PCT/JP2018/021471
§ 371 (c)(1),
(2) Date: Dec. 3, 2019

(87) PCT Pub. No.: WO2018/225704
PCT Pub. Date: Dec. 13, 2018

(65) Prior Publication Data
US 2020/0087418 A1    Mar. 19, 2020

(30) Foreign Application Priority Data

Jun. 6, 2017 (JP) .............................. JP2017-111299

(51) Int. Cl.
*C08B 37/16* (2006.01)
(52) U.S. Cl.
CPC ................................ *C08B 37/0015* (2013.01)

(58) Field of Classification Search
None
See application file for complete search history.

(56) References Cited

U.S. PATENT DOCUMENTS

| 2009/0312490 A1 | 12/2009 | Ito et al. |
| 2011/0105688 A1 | 5/2011 | Ruslim et al. |
| 2011/0118376 A1 | 5/2011 | Hayashi et al. |
| 2015/0094463 A1 | 4/2015 | Oomori et al. |

FOREIGN PATENT DOCUMENTS

| CN | 101768279 A | 7/2010 |
| CN | 104203984 A | 12/2014 |
| WO | 2005/080469 A1 | 9/2005 |
| WO | 2009/145073 A1 | 3/2009 |
| WO | 2009/136618 A1 | 11/2009 |
| WO | 2013/099842 A1 | 7/2013 |

*Primary Examiner* — Layla D Berry
(74) *Attorney, Agent, or Firm* — Christensen O'Connor Johnson Kindness PLLC

(57) ABSTRACT

The present invention provides a polyrotaxane having high durability and in particular, high hydrolysis resistance, and a method for producing said polyrotaxane. The present invention provides a polyrotaxane obtained by disposing blocking groups on both ends of a pseudopolyrotaxane so that an annular molecule cannot be displaced, said pseudopolyrotaxane being obtained by forming a clathrate by piercing the opening of the cyclic molecule with a linear molecule, said polyrotaxane being characterized in that the cyclic molecule has a substituent represented by formula I (in formula I, $R_1$ represents a group such as —$CH_3$ and —$CH_2$—$CH_3$, $R_2$ represents H or a group such as —$CH_3$, and n is the apparent degree of polymerization of a polyalkylene oxide chain or a derivative thereof added to the cyclic molecule, the value of n being 1.1 to 10.0).

4 Claims, 1 Drawing Sheet

POLYROTAXANE HAVING SUBSTITUENT HAVING POLYALKYLENE OXIDE CHAIN OR DERIVATIVE THEREOF IN CYCLIC MOLECULE, AND METHOD FOR PRODUCING SAID POLYROTAXANE

TECHNICAL FIELD

The present invention relates to a polyrotaxane in which a cyclic molecule has a substituent comprising a polyalkylene oxide chain or a derivative thereof, a material comprising the polyrotaxane, and a method for producing the polyrotaxane.

BACKGROUND ART

Attentions are paid to a polyrotaxane since the polyrotaxane has a special structure in which a cyclic molecule is movable relatively to an axial molecule, and the cyclic molecule comprises various substituents, to vary the characteristics of the polyrotaxane.

Patent Documents 1 and 2 disclose, for example, a techniques for giving a graft chain graft-polymerized from monomers to the cyclic molecule of the polyrotaxane.

Specifically, Patent Document 1 discloses a polyrotaxane modified with -MA, -MB and -C modifying groups in a cyclic molecule of the polyrotaxane, wherein M is a modifying group having an average degree of polymerization (n) of 1 to 20 represented by the formula IV or the formula V, and the modifying group is a polyester or polyamide structure, specifically polycaprolactone or polycaprolactam.

Patent Document 2 discloses a polyrotaxane in which a cyclic molecule of the polyrotaxane has a radical polymerization initiation site, and the polyrotaxane having a graft chain polymerized with a radical polymerizable monomer via the radical polymerization initiation site. Specifically, the graft chain formed by polymerization of the monomer is a polyacrylate ester chain.

Further, Patent Document 3 discloses a crosslinked polyrotaxane formed by bonding polyrotaxanes through chemical bonds, and discloses that a part of hydroxyl groups of cyclodextrin of the polyrotaxane is bonded with a nonionic bonding group. As a nonionic bonding group, a 2-hydroxypropyl group is disclosed.

More, Patent Document 4 discloses that a part of hydroxyl groups of cyclodextrin of polyrotaxane is substituted with a substituent represented by the formula (1), such as a 2-hydroxybutyl substituent.

However, Patent Documents 1 to 4 have a problem of durability due to poor hydrolysis resistance, and/or a problem of poor compatibility or poor affinity with materials other than polyrotaxane. Even if the cyclic molecule described in Patent Document 1 or Patent Document 2 has a graft chain, it has a polyester structure or a polyamide structure (Patent Document 1), or a polyacryl ester structure (Patent Document 2), and thus has a problem of durability due to poor hydrolysis resistance. Further, in Patent Documents 3 and 4, since the cyclic molecule does not have a graft chain, compatibility and affinity with the desired material cannot be obtained.

PRIOR ART DOCUMENT

Patent Document

Patent Document 1: WO2009/145073.
Patent Document 2: WO2009/136618.
Patent Document 3: WO2005/080469.
Patent Document 4: WO2013/099842.

DISCLOSURE OF THE INVENTION

Problems to be Solved by the Invention

An object of the present invention is to provide a polyrotaxane having durability, in particular hydrolysis resistance, and possessing compatibility with desired materials, for example polymer materials other than a polyrotaxane.

Further, an object of the present invention is, in addition to the above object, to provide a material comprising the polyrotaxane.

More, an object of the present invention is, in addition to, or other than the above objects, to provide a crosslinked body comprising the polyrotaxane.

Further, an object of the present invention is, in addition to, or other than the above objects, to provide a product comprising the polyrotaxane, the material, and/or the crosslinked body.

More, an object of the present invention is, in addition to, or other than the above objects, to provide a method for producing the polyrotaxane, the material, the crosslinked body, and/or the product.

Means for Solving Problems

The present inventors have found the following inventions:

<1> A polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule has a substituent represented by following formula I, wherein $R_1$ represents at least one group selected from the group consisting of —$CH_3$, —$CH_2$—$CH_3$, —$CH_2$—O—$CH_3$, —$CH_2$—O—$CH_2$—$CH_3$, —$CH_2O$—CH—$(CH_3)_2$, and -phenyl group;

$R_2$ represents at least one group selected from the group consisting of H, —$CH_3$, —OCONH—$(CH_2)_3$—$CH_3$, —OCONH—$C_{18}H_{37}$, and —$COCH_3$;

n represents an apparent degree of polymerization of a polyalkylene oxide chain or a derivative thereof added to the cyclic molecule, and the value of n ranges from 1.1 to 10.0:

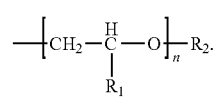

$$-\left[CH_2-\underset{R_1}{\overset{H}{C}}-O\right]_n-R_2.$$

I

<2> In the above item <1>, the value of n may range from 2.0 to 8.0, preferably 3.0 to 6.0.

<3> In the above item <1> or <2>, $R_1$ may be at least one group selected from the group consisting of —$CH_3$, —$CH_2$—$CH_3$, and —$CH_2$—O—$CH_2$—$CH_3$, preferably at least one group selected from the group consisting of —$CH_3$, and —$CH_2$—$CH_3$.

<4> In anyone of the above items <1> to <3>, $R_2$ may be at least one group selected from the group consisting of H, —OCONH—$(CH_2)_3$—$CH_3$, —OCONH—$C_{18}H_{37}$, and —COCH₃, preferably at least one group selected from the group consisting of H, and —OCONH—(CH₂)₃—CH₃.

<5> A method for preparing a polyrotaxane B, comprising the steps of:

(a) preparing a polyrotaxane A which comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and (b) reacting a compound represented by following formula II, wherein $R_1$ has the same definition as described above, with the polyrotaxane A to provide a substituent represented by following formula I wherein $R_1$, $R_2$, and n each has the same definition as described above;

thereby to obtain the polyrotaxane B in which the cyclic molecule comprises the substituent represented by the above formula I:

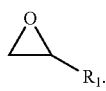

<6> In the step (b) of the above item <5>, the reaction may be carried out in the presence of i) a super strong base, or ii) a polymerization initiator.

<7> A material comprising the polyrotaxane according to anyone of the above items <1> to <4>.

<8> A material comprising the polyrotaxane according to anyone of the above items <1> to <4>, and a substance other than the polyrotaxane according to anyone of the above items <1> to <4>, wherein a part of the substance and a part of the polyrotaxane are directly or indirectly bound to each other.

<9> A product comprised of the polyrotaxane according to anyone of the above items <1> to <4>.

<10> A product comprised of the material according to the above item <7> or <8>.

Effects of the Invention

The present invention can provide a polyrotaxane having durability, in particular hydrolysis resistance, and possessing compatibility with desired materials, for example polymer materials other than polyrotaxane.

Further, in addition to the above effect, the present invention can provide a material comprising the polyrotaxane.

More, in addition to, or other than the above effects, the present invention can provide a crosslinked body comprising the polyrotaxane.

Further, in addition to, or other than the above effects, the present invention can provide a product comprising the polyrotaxane, the material, and/or the crosslinked body.

More, in addition to, or other than the above effects, the present invention can provide a method for producing the polyrotaxane, the material, the crosslinked body, and/or the product.

EMBODIMENTS FOR CARRYING OUT THE INVENTION

Figure 1:
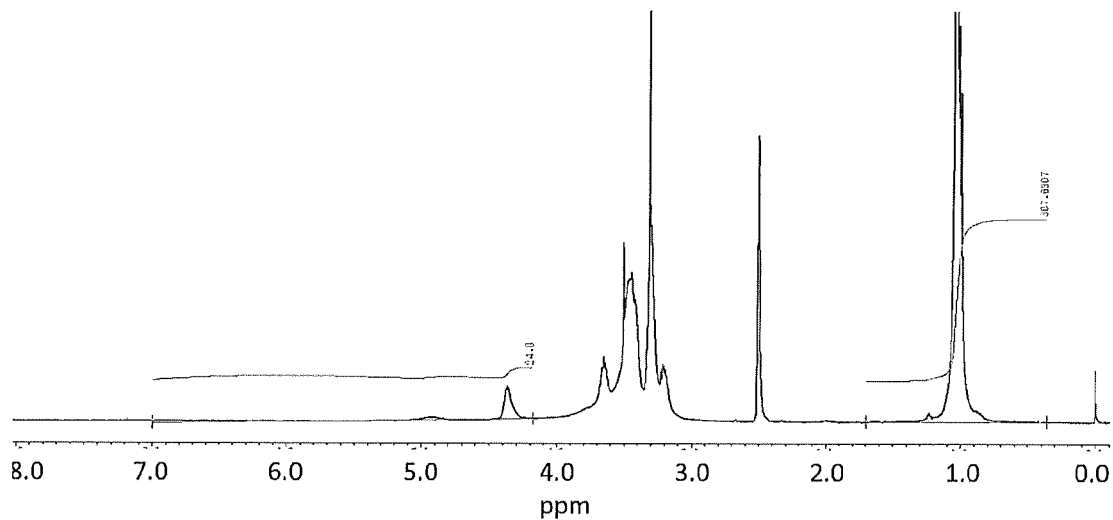
FIG. 1 shows a ¹H-NMR (DMSO-d⁶) chart of the polyrotaxane A4 obtained by Example 4.

The present invention described in the present application will be described in detail hereinafter.

<Polyrotaxane According to the Present Invention>

The present application provides a polyrotaxane, in which a cyclic molecule comprises a substituent having a polyalkylene oxide chain or a derivative thereof, specifically, a substituent represented by following formula I.

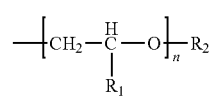

The polyrotaxane according to the present invention can have durability due to the inclusion of the substituent represented by the above formula I, since the substituent has hydrolysis resistance unlike a polyester structure or a polyamide structure.

Further, a substituent represented by the above formula I, that is, a polyalkylene oxide chain or a derivative thereof can provide the following effects:

i) The solubilities in solvents are improved, and various solvents can be used when the polyrotaxane according to the present invention is used.

ii) Compatibility between the polyrotaxane and the desired material can be possessed. Specifically, compatibility between the polyrotaxane according to the present invention and a polymer other than the polyrotaxane can be possessed. As a result, high functionality can be expected by blending with a desired material such as a polymer other than the polyrotaxane, expanding the blend, or combining the materials.

iii) The mechanical properties of the material having the polyrotaxane according to the present invention can be controlled. For example, improvement in the flexibility, heat resistance, and characteristics such as dielectric constant can be expected due to the synergistic effect with the flexibility of the polyalkylene oxide chain or a derivative thereof.

In the above formula I, n represents an apparent degree of polymerization of a polyalkylene oxide chain or a derivative thereof added to the cyclic molecule.

Since there has distribution in the polyalkylene oxide chain or a derivative thereof added to the cyclic molecule, the value of n is represented by decimal point.

The value of n may range from 1.1 to 10.0, preferably 2.0 to 8.0, more preferably 3.0 to 6.0.

The value of n can be calculated from a ¹H-NMR chart that is a measurement result of ¹H-NMR of the polyrotaxane according to the present invention. However, in the ¹H-NMR chart, it is difficult to calculate the true degree of polymerization because of many peak overlaps. Therefore, n was defined as the apparent degree of polymerization.

As a method for calculating the n, described is a case where the raw material polyrotaxane A (hereinafter may be simply referred to as the "polyrotaxane A") is reacted with an alkylene oxide monomer or a derivative thereof (hereinafter may be simply referred to as "monomer C") to obtain the polyrotaxane B of the present invention in which a cyclic molecule has a substituent comprising a polyalkylene oxide chain or a derivative thereof (hereinafter may be simply referred to as "modified polyrotaxane B"). Additionally, a case where the cyclic molecule of the raw material polyrotaxane A is α-cyclodextrin (hereinafter simply referred to as "α-CD") is described.

The n is the same numerical value as the "addition rate" described below.

The "addition rate" represents the number of "monomer C" in the "modified polyrotaxane B" relative to the number of hydroxyl groups of α-CD which is a cyclic molecule in the raw material "polyrotaxane A".

The "monomer C" to be reacted has a structure having an oxirane group (epoxy group), and a plurality of the monomers can sequentially react with one hydroxyl group. Therefore, the addition rate may exceed 100% relative to the hydroxyl groups of the raw material. In this case, a polyalkylene oxide chain or a derivative thereof is imparted to at least a part of the α-CD hydroxyl groups that is a cyclic molecule of the raw material "polyrotaxane A". For example, when the addition rate is 120%, 20% of 18 hydroxyl groups of α-CD are averagely added by a plurality of "monomer C".

Here, the "addition rate" will be described with reference to the $^1$H-NMR chart that was actually obtained with the polyrotaxane according to the present invention.

FIG. 1 is a $^1$H-NMR chart of the polyrotaxane according to the present invention, that is, a polyrotaxane having a polypropylene oxide chain, obtained in Example 4 described later.

In the chart, the peak at 1 ppm is derived from $-CH_3$ of the propylene oxide group. The integrated value of the peak at 1 ppm is set as L.

The peak at 4.2 to 6.5 ppm is derived from a plurality of types of H, specifically, "H of hydroxyl group of α-CD", "H of terminal hydroxyl group of reacted propylene oxide", and "H of C1 of the glucose site of α-CD". The integrated value of the peak at 4.2 to 6.5 ppm is set as M.

When the addition rate of propylene oxide is set as Y, the integrated value L of the peak at 1 ppm (derived from $-CH_3$ of the propylene oxide group) is "Y×3×18".

On the other hand, the integrated value M of the peak at 4.2 to 6.5 ppm is the total of "(1−Y)×18" derived from "H of the hydroxyl group of α-CD", "Y×18" derived from "H of the terminal hydroxyl group of the reacted propylene oxide", and "6" derived from "H of C1 at the glucose site of α-CD".

The ratio between the integrated values L and M is calculated by the following equation, and the addition rate Y can be calculated by assigning the measurement results (L is 307.69, and M is 24.0).

$$L:M=(Y \times 3 \times 18):\{(1-Y) \times 18 + Y \times 18 + 6\}$$

$$54Y:24=307.69/24.0.$$

Addition rate $Y=5.69$ (569%)

As described above, since the addition rate is the same value as n, the apparent degree of polymerization n is 5.69.

Figure 2:
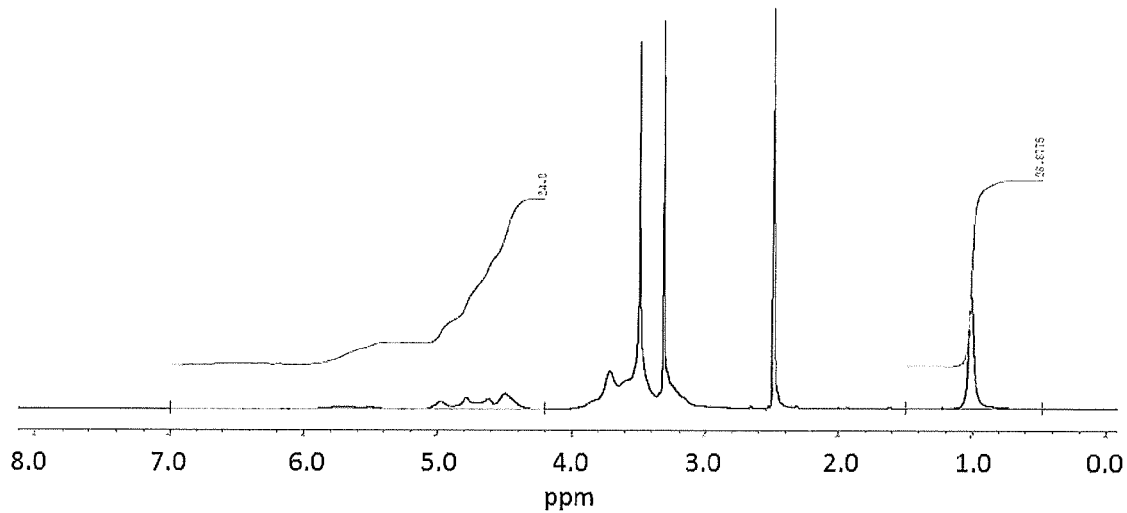
FIG. 2 shows a ¹H-NMR (DMSO-d⁶) chart of the polyrotaxane C1 obtained by Comparative Example 1.

FIG. 2 is a $^1$H-NMR chart of the polyrotaxane obtained in Comparative Example 1 described later.

The addition rate $Y=0.497$ (50%) is calculated from the integrated value L (26.88) of the peak at 1 ppm and the integrated value M (24.0) of the peak at 4.2 to 6.5 ppm, and the apparent degree of polymerization n is 0.5.

The addition rate, that is, the apparent degree of polymerization n, can be measured from the difference between the weight-average molecular weight of "modified polyrotaxane B" and the weight-average molecular weight of "raw material polyrotaxane A", that is, the "increase in weight-average molecular weight"; and the "inclusion rate" of "raw material polyrotaxane A" (the number of α-CD per molecule of "modified polyrotaxane B"). However, it can be said that calculating the addition rate from the "increase in weight-average molecular weight" lacks accuracy because of, for example, the difference in polarity between "modified polyrotaxane B" and "raw material polyrotaxane A" and the difference in their solubility in GPC solvents.

The "inclusion rate" can be determined as follows.

The "inclusion rate" is the value representing the rate of the number of cyclic molecules (α-CD) actually arranged relative to the number of cyclic molecules (α-CD) arranged at the highest density in "raw material polyrotaxane A" and "modified polyrotaxane B". The maximum density (maximum inclusion amount) of α-CD is determined by the length of the linear molecule and the thickness of the cyclic molecule. When the linear molecule is polyethylene glycol (PEG), it is obtained by the method described in Macromolecules 1993, 26, 5698-5703. Two repeating units of $-(O-CH_2-CH_2)_2-$ of polyethylene glycol correspond to the molecular thickness of α-CD. For example, for a PEG with a number average molecular weight of 35000, the maximum inclusion amount of α-CD is 35000/88=398. When 398 α-CDs are included in a PEG with a number average molecular weight of 35000, the inclusion rate is 100%.

The "inclusion rate of α-CD" can be obtained from the ratio of the integrated value of H derived from α-CD and H of PEG from $^1$H-NMR based on the H of PEG in the case of the above-described maximum inclusion amount of α-CD.

In the formula I, $R_1$ represents at least one group selected from the group consisting of $-CH_3$, $-CH_2-CH_3$, $-CH_2-O-CH_3$, $-CH_2-O-CH_2-CH_3$, and $-CH_2O-CH-(CH_3)_2$, and -phenyl group, preferably at least one group selected from the group consisting of $-CH_3$, $-CH_2-CH_3$, and $-CH_2-O-CH_2-CH_3$, more preferably at least one group selected from the group consisting of $-CH_3$, and $-CH_2-CH_3$.

In the formula I, $R_2$ represents at least one group selected from the group consisting of H, $-CH_3$, $-OCONH-(CH_2)_3-CH_3$, $-OCONH-C_{18}H_{37}$, and $-COCH_3$, preferably at least one group selected from the group consisting of H, $-OCONH-(CH_2)_3-CH_3$, $-OCONH-C_{18}H_{37}$, and $-COCH_3$, more preferably at least one group selected from the group consisting of H, and $-OCONH-(CH_2)_3-CH_3$.

Other than the substituent represented by the above formula I, the polyrotaxane according to the present invention comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s). Hereinafter, a cyclic molecule, a linear molecule, and a capping group which are components of the polyrotaxane will be described.

<Cyclic Molecule>

The cyclic molecule of the polyrotaxane is not limited as long as the cyclic molecule may be cyclic, and may have a cavity, and a linear molecule is included in the cavity (cavities) of the cyclic molecules in a skewered manner.

The cyclic molecule may have, depending on a desired material as described hereinafter, a desired crosslinked body as described hereinafter, a desired product as described hereinafter, a hydroxyl group (—OH group).

The hydroxyl group (—OH group) may bind directly to a cyclic bone of the cyclic molecule, or bind to the cyclic bone via a first spacer, depending on the desired material, the desired crosslinked body, the desired product and the like.

The cyclic molecule may have, depending on characteristics of the desired material, the desired crosslinked body, the desired product and the like, a group other than the hydroxyl group, such as 1) a hydrophobic modifying group such as a methoxy group, an ethoxy group, an acetyl group, a butylcarbamoyl group; 2) a group selected from the group consisting of —NH$_2$, —COOH, and —SH; 3) a polymerizable group selected from the group consisting of an acrylic group, a methacrylic group, a styryl group, a vinyl group, a vinylidene group, a polymeric group of a maleic anhydride containing functional group.

The cyclic molecule may be, for example, selected from the group consisting of α-cyclodextrin, β-cyclodextrin and γ-cyclodextrin.

<Linear Molecule>

The linear molecule of the polyrotaxane is not limited as long as the linear molecule may be included in a cavity (cavities) of the cyclic molecule(s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule may be 1,000 or more, preferably 3,000 to 100,000, more preferably 6,000 to 50,000.

In the polyrotaxane, the combination of (cyclic molecule, linear molecule) may be (one derived from α-cyclodextrin, one derived from polyethylene glycol).

<Capping Group>

The capping group of the polyrotaxane is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; silsequioxanes; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural); polycyclic aromatics which may be substituted (examples of the substituent may include, but are not limited to, those described above. The substituent may be single or plural); and steroids. Preferably, the capping group may be selected from the group consisting of dinitrophenyl groups; cyclodextrins; adamantane groups; trityl groups; fluoresceins; silsequioxanes; and pyrenes, more preferably adamantane groups or cyclodextrins.

<Material Comprising the Polyrotaxane According to the Present Invention>

The present application provides a material comprising the above polyrotaxane according to the present invention.

The material may comprise a substance other than the above polyrotaxane according to the present invention.

Examples of the substance may include, but are not limited to, substances that can bind to polyrotaxane, such as poly (meth)acrylic acid esters, polyamides, polyesters, polyethers, polyolefins, polydienes, polysiloxanes, polystyrenes, polyurethanes, polyureas, polycarbonates, polyamic acids, and derivatives thereof.

In the material of the present invention, at least a part of the substance and at least a part of the polyrotaxane according to the present invention may be directly or indirectly bonded to form a crosslinked body.

Here, the "substance that can indirectly bind" refers to a substance that can bind to polyrotaxane using an intervening substance such as a crosslinking agent through the intervening substance such as a crosslinking agent. On the other hand, the "substance that can directly bind" refers to a substance that can bind to polyrotaxane in the presence of heat, a catalyst, an initiator or the like without using the intervening substances.

For example, when the substance is polyacrylic acid, it can directly bind to polyrotaxane in the presence of a catalyst. Further, when the substance is propylene glycol, it can indirectly bind to between polypropylene glycol and the hydroxyl group of the polyrotaxane according to the present invention via a polyfunctional isocyanate compound such as hexamethylene diisocyanate as a crosslinking agent. The crosslinking agent is not particularly limited as long as it is a compound having a functional group that reacts polyrotaxane with a substance other than polyrotaxane. Examples of the crosslinking agent may include, but are not limited to, polyfunctional isocyanate compounds, polyfunctional carboxylic acids, polyfunctional carboxylic acid anhydrides, polyfunctional epoxy compounds, polyfunctional carbodiimides, polyols, polyamines and the like.

<Product Comprising the Polyrotaxane According to the Present Invention>

The present application provides a product comprising the polyrotaxane according to the present invention.

The present application also provides a product comprising the above-described material.

The present application provides a product comprising the above-described material, in particular a crosslinked body.

These products may include various components that impart desired characteristics to the product. Examples of these components may include, but are not limited to, plasticizers, surfactants, UV absorbers, pigments, antioxidants, antibacterial agents, viscosity modifiers, reinforcing fibers, fine particles, flame retardants and the like.

The polyrotaxane, material, crosslinked body, and/or product of the present invention have various applications due to their properties. Examples of the application may include, but are not limited to, pressure-sensitive adhesives and adhesives, scratch-resistant films, anti-vibration, damping, and isolation materials, paints, coating agents, sealants, ink additives and binders, electrical insulation materials, electrical and electronic component materials, optical materials, friction control agents, cosmetic materials, rubber additives, resin modifying and toughening agents, rheology control agents, thickeners, fibers, medical biomaterials, mechanical and automotive materials, building materials, and clothing and sporting goods.

<Method for Producing the Polyrotaxane According to the Present Invention>

The above polyrotaxane according to the present invention can be produced by the following method:

The method comprises the steps of:

(a) preparing a polyrotaxane A which comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and (b) reacting a compound represented by following formula II, wherein $R_1$ has the same definition as described above, with the polyrotaxane A to provide a substituent represented by following formula I wherein $R_1$, $R_2$, and n each has the same definition as described above;

thereby to obtain a polyrotaxane B, i.e., the polyrotaxane according to the present invention.

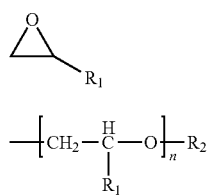

<<Step (a)>>

The step (a) is a step of preparing the polyrotaxane A.

The step (a) can be carried out by conventionally-known method. For example, the polyrotaxane A can be prepared by the method described in WO2005/052026 or WO2013/147301. Furthermore, the polyrotaxane A can be carried out by being commercially available.

<<Step (b)>>

The step (b) is a step of reacting a compound represented by the above formula II with the polyrotaxane A to provide a substituent represented by the above formula I. Furthermore, when $R_2$ is other than H, the compound represented by the above formula II may be reacted with polyrotaxane A, followed by addition of the corresponding R group to all or a part of the terminal hydroxyl groups (R=H terminal hydroxyl groups).

In the step (b), the reaction conditions may be established depending on the polyrotaxane A and the compound used. The reaction may be carried out in the presence of i) a super strong base or ii) a polymerization initiator.

Examples of the i) super strong base may include, but are not limited to, phosphazene bases, guanidine bases, proazaphosphatran bases, and metal bases. Among these, phosphazene bases may be preferably used. When a super strong base is used, the conditions may be, but are not limited to, from 20° C. to 100° C., and normal or increased pressure.

Examples of the ii) polymerization initiator may include, but are not limited to, tetra-n-butylammonium fluoride. When a polymerization initiator is used, it may be used in combination with a strong base. Examples of the strong base may include, but are not limited to, diazabicycloundecene (DBU), 1,5-diazabicyclo[4.3.0]non-5-ene (DBN), trimethylamine, N,N-dimethyl-4-aminopyridine, sodium hydroxide, and potassium hydroxide. When a polymerization initiator is used, the conditions may be, but are not limited to, from 20° C. to 100° C., and normal or increased pressure.

The step (b) may or may not use additional solvent. When another solvent is used, examples of the solvent may include, but are not limited to, dimethyl sulfoxide, dimethylformamide, dimethylacetamide, N-methyl-2-pyrrolidone, toluene, xylene, and methyl ethyl ketone and the like.

In the step (b), the reaction may be carried out under normal pressure to increased pressure, but pressurization can promote the reaction. The reaction temperature may be from room temperature to 130° C., depending on, for example, the polyrotaxane A used, the compound used, and the solvent used.

<Method for Producing Material of the Present Invention>

The material can be produced using the polyrotaxane according to the present invention as obtained above.

The method for producing the material depends on the substance used other than the polyrotaxane according to the present invention. Examples of the substance used other than the polyrotaxane according to the present invention include the above-described substances. When one of these are used, as described above, at least a part of the polyrotaxane according to the present invention and at least a part of the substance can be bonded directly or indirectly to form a crosslinked body.

For example, when propylene glycol diol is used as the substance, in the presence of a polyfunctional isocyanate compound such as hexamethylene diisocyanate as a crosslinking agent (c)-1, the polyrotaxane according to the present invention is reacted with the substance other than the polyrotaxane, specifically, a polyfunctional isocyanate compound such as propylene glycol diol or hexamethylene diisocyanate, thereby indirectly bonding at least a part of the polyrotaxane according to the present invention and at least a part of propylene glycol diol via the polyfunctional isocyanate compound such as hexamethylene diisocyanate to form a crosslinked body. The crosslinking agent may be the one mentioned above.

Alternatively, in the presence of a catalyst (c)-2 and an initiator, the polyrotaxane according to the present invention is reacted with a substance other than the polyrotaxane, thereby directly bonding at least a part of the polyrotaxane according to the present invention and at least a part of the substance to form a crosslinked body.

EXAMPLES

Hereinafter, the present invention will be described in more detail by using, but not limited to, following examples.

In the following Examples, the polyrotaxane APR20 (linear molecule: PEG (Mw: 20,000); cyclic molecule: α-CD; capping groups: adamantane groups, weight-average molecular weight=83,600) was prepared according to a manner described in WO2005/052026 or WO2013/147301.

Further, the polyrotaxane APR35 (linear molecule: PEG (Mw: 35,000); cyclic molecule: α-CD; capping groups: adamantane groups, weight-average molecular weight=95,000) was prepared according to a manner described in WO2005/052026 or WO2013/147301.

Example 1

In a reaction vessel, 70 g of polyrotaxane APR20 was dissolve in a mixed solution of 10 ml of 1,5-diazabicyclo [4.3.0]non-5-ene (DBN) and 7.5 ml of 1N tetra-n-butylammonium fluoride (TBAF), and 40 ml of propylene oxide was added dropwise at room temperature (25° C.) while stirring. The stirring was continued at room temperature for 72 hours, and then the resulting reaction product was purified with a dialysis membrane, and dried, to obtain 30 g of purified product A1.

As a result of $^1$H-NMR analysis, the addition rate of propylene oxide was 113% (relative to the hydroxyl groups of α-CD). Therefore, the addition of polypropylene oxide graft chain to at least a part of the hydroxyl groups of α-CD was confirmed. As described above, the n is the same numerical value as the addition rate. Therefore, the n was 1.1.

Example 2

32 g of a purified product A2 was obtained in a manner similar to Example 1, except that 20 ml of DBN was used instead of 10 ml of DBN and that the stirring was continued for 48 hours instead of 72 hours.

As a result of $^1$H-NMR analysis, the addition rate of propylene oxide was 112% (relative to the hydroxyl groups of α-CD). Therefore, the addition of polypropylene oxide graft chain to at least a part of the hydroxyl groups of α-CD was confirmed. The n was 1.1.

Example 3

38 g of a purified product A3 was obtained in a manner similar to Example 1, except that the stirring was continued for 144 hours instead of 72 hours.

As a result of $^1$H-NMR analysis, the addition rate of propylene oxide was 204% (relative to the hydroxyl groups of α-CD). Therefore, the addition of polypropylene oxide graft chain to at least a part of the hydroxyl groups of α-CD was confirmed. The n was 2.0.

Example 4

1 g of polyrotaxane APR20 was introduced into 20 ml of propylene oxide, and 2 ml of DBN and 1 ml of 1N TBAF were introduced while stirring. After the reaction was continued at 30° C. for 72 hours, the resulting reaction product was purified with a dialysis membrane, and dried, to obtain 3.3 g of purified product A4.

As a result of $^1$H-NMR analysis, the addition rate of propylene oxide was 570% (relative to the hydroxyl groups of α-CD).

As a result of GPC analysis, the weight-average molecular weight Mw was 168,000, and the distribution Mw/Mn was 1.2. The addition of polypropylene oxide graft chain to the hydroxyl groups of α-CD was confirmed. The n was 5.7.

Comparative Example 1

10 g of polyrotaxane APR35 was dissolved in 50 ml of 1.5N NaOH aqueous solution, and 200 g of propylene oxide was slowly added dropwise, followed by reaction at 25° C. for hours. The reaction solution was neutralized with hydrochloric acid, purified with a dialysis membrane, and dried, to obtain 11.5 g of purified product C1.

As a result of $^1$H-NMR analysis, the addition rate of propylene oxide was 50%. The n was 0.5.

Example 5

5 g of polyrotaxane APR20 was introduced into 50 ml of butylene oxide, and 10 ml of DBN and 5 ml of 1N TBAF were introduced while stirring. After the reaction was continued at 50° C. for 72 hours, the resulting reaction product was washed with water three times, and dried, to obtain 12.0 g of purified product A5.

As a result of GPC analysis, the weight-average molecular weight Mw was 173,000, and the distribution Mw/Mn was 1.2.

As a result of $^1$H-NMR analysis, the addition rate of butylene oxide was 131% (relative to the hydroxyl groups of α-CD). The addition of polybutylene oxide graft chain to the hydroxyl groups of α-CD was confirmed. The n was 1.3.

Example 6

5 g of polyrotaxane APR20 was introduced into 50 ml of butylene oxide, and 40 ml of triethylamine and 20 ml of 1N TBAF were introduced while stirring. After the reaction was continued at 50° C. for 48 hours, the resulting reaction product was washed with water three times, and dried, to obtain 13 g of purified product A6.

As a result of GPC analysis, the weight-average molecular weight Mw was 133,000, and the distribution Mw/Mn was 1.3.

As a result of $^1$H-NMR analysis, the addition rate of butylene oxide was 116% (relative to the hydroxyl groups of α-CD). The addition of polybutylene oxide graft chain to the hydroxyl groups of α-CD was confirmed. The n was 1.2.

Example 7

5 g of polyrotaxane APR20 was introduced into 200 ml of ethyl glycidyl ether, and 10 ml of DBN and 20 ml of 1N TBAF were introduced while stirring. After the reaction was continued at 60° C. for 48 hours, the resulting reaction product was washed with water three times, and dried, to obtain 18 g of purified product A7.

As a result of GPC analysis, the weight-average molecular weight Mw was 191,000, and the distribution Mw/Mn was 1.3.

As a result of $^1$H-NMR analysis, the addition rate of ethyl glycidyl ether was 112% (relative to the hydroxyl groups of α-CD). The addition of —$(CH_2CH(OCH_2CH_3)O)_n$—H graft chain to the hydroxyl groups of α-CD was confirmed. The n was 1.1.

Example 8 g of polyrotaxane APR20 was dissolved in 10 ml of dimethyl sulfoxide (DMSO), introduced into 10 ml of propylene oxide, and 2 ml of DBN and 1 ml of 1N TBAF were introduced while stirring. After the reaction was continued at 30° C. for 72 hours, the resulting reaction product was washed with water three times, and dried, to obtain 3.2 g of purified product A8.

As a result of GPC analysis, the weight-average molecular weight Mw was 168,000, and the distribution Mw/Mn was 1.3.

As a result of $^1$H-NMR analysis, the addition rate of propylene oxide was 142% (relative to the hydroxyl groups of α-CD). The addition of polypropylene oxide graft chain to the hydroxyl groups of α-CD was confirmed. The n was 1.4.

Comparative Example 2

In Example 8, 0.8 g of purified product C2 was obtained in a manner similar to Example 8, except that DBN was not used.

As a result of GPC analysis, the weight-average molecular weight Mw was 81,600, and the distribution Mw/Mn was 1.3.

As a result of $^1$H-NMR analysis, the addition rate of propylene oxide was 0% (relative to the hydroxyl groups of α-CD). That is, the reaction did not proceed.

Example 9

1 g of polyrotaxane APR35 was dissolved in 10 ml of DMSO, 1.34 ml of 0.8 M phosphazene base P4-t-Bu solution in hexane (manufactured by Aldrich), and 5 g of butylene oxide were introduced thereto, and the mixture was allowed to react at 60° C. for 20 hours. The product was washed with water three times, and dried, to obtain 3.1 g of purified product A9.

As a result of GPC analysis, the weight-average molecular weight Mw was 258,000, and Mw/Mn was 1.3.

As a result of $^1$H-NMR analysis, the addition rate of butylene oxide was 126% (relative to the hydroxyl groups of α-CD). The addition of polybutylene oxide graft chain to the hydroxyl groups of α-CD was confirmed. The n was 1.3.

Comparative Example 3

1.3 g of purified product C3 was obtained in a manner similar to Example 9, except that 1 ml of diazabicycloundecene (DBU) was used in place of 1.34 ml of 0.8 M phosphazene base P4-t-Bu solution in hexane solution (manufactured by Aldrich).

As a result of GPC analysis, the weight-average molecular weight Mw was 125,000, and Mw/Mn was 1.3.

As a result of $^1$H-NMR analysis, the addition rate of butylene oxide was 23.1% (relative to the hydroxyl groups of α-CD). That is, the n was 0.23.

Example 10

Using the purified product A4 obtained in Example 4 and the purified product C1 obtained in Comparative Example 1, solubility and compatibility in various materials were examined, and evaluated according to the following criteria.
○: The purified product was dissolved by 2 wt % or more with respect to the target material.
x: The purified product was insoluble in the target material.

The results are shown in Table 1. The PPG400, PPG700, and PPG1000 are polypropylene glycols having number average molecular weights of 400, 700, and 1000 (manufactured by Wako Pure Chemical Industries, Ltd.).

Table 1 shows that the purified product A1, which is the polyrotaxane according to the present invention, has dramatically improved compatibility with the PPG material compared to the purified product C1 of Comparative Example 1.

TABLE 1

Compatibility of purified body A1, polyrotaxane according to the present invention and purified body C1 of Comparative Example 1 with each solvent

| Material | A1 | C1 |
|---|---|---|
| PPG400 | ○ | x |
| PPG700 | ○ | x |
| PPG1000 | ○[a] | x[a] |
| Water | ○[b] | ○ |

[a] soluble or compatible in elevated temperature
[b] shows lowest critical solution temperature (LCST)

Example 11

In a reaction vessel, 9.0 g of 1,3-bis(isocyanatomethyl) cyclohexane (Takenate 600, manufactured by Mitsui Chemicals, Inc.) was placed, and heated to 80° C. while stirring in a nitrogen stream. Into the reaction vessel, 7.1 g of polypropylene glycol 700 (manufactured by Wako Pure Chemical Industries, Ltd.) was slowly dropped, and then the mixture was further stirred for 3 hours, to obtain 16 g of a polymer having polypropylene glycol modified with isocyanate groups at both ends (polymer P).

0.5 g of the polymer P obtained and 2.0 g of the polyrotaxane having a polypropylene oxide graft chain obtained in Example 4 were quickly mixed, to obtain a uniform mixed solution. The solution was applied to a glass substrate and cured by heating at 80° C. for 30 minutes, thereby to obtain a flexible and transparent elastomer sheet.

What is claimed is:
1. A polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule has a substituent represented by following formula I, wherein $R_1$ represents at least one group selected from the group consisting of —CH$_3$, —CH$_2$—CH$_3$, —CH$_2$—O—CH$_3$, —CH$_2$—O—CH$_2$—CH$_3$, —CH$_2$—O—CH—(CH$_3$)$_2$, and -phenyl group;
$R_2$ represents at least one group selected from the group consisting of H, —CH$_3$, —OCONH—(CH$_2$)$_3$—CH$_3$, —OCONH—C$_{18}$H$_{37}$, and —COCH$_3$;
n represents an apparent degree of polymerization of a polyalkylene oxide chain or a derivative thereof added to the cyclic molecule, and the value of n ranges from 1.1 to 10.0:

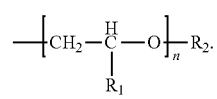

I

2. A method for preparing a polyrotaxane B, comprising the steps of:

(a) preparing a polyrotaxane A which comprises a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and (b) reacting a compound represented by following formula II, wherein $R_1$ represents at least one group selected from the group consisting of $-CH_3$, $-CH_2-CH_3$, $-CH_2-O-CH_3$, $-CH_2-O-CH_2-CH_3$, $-CH_2-O-CH-(CH_3)_2$, with the polyrotaxane A to provide a substituent represented by following formula I wherein $R_1$ has the same definition as described above; $R_2$ represents at least one group selected from the group consisting of H, $-CH_3$, $-OCONH-(CH_2)_3-CH_3$, $-OCONH-C_{18}H_{37}$, and $-COCH_3$; and n represents an apparent degree of polymerization of a polyalkylene oxide chain or a derivative thereof added to the cyclic molecule, and the value of n ranges from 1.1 to 10.0, wherein the reaction is carried out in the presence of i) a super strong base, or ii) a polymerization initiator;

thereby to obtain the polyrotaxane B in which the cyclic molecule comprises the substituent represented by following formula I:

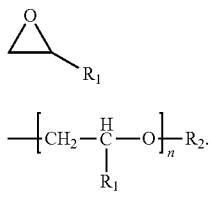

3. A material comprising a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule has a substituent represented by following formula I, wherein $R_1$ represents at least one group selected from the group consisting of $-CH_3$, $-CH_2-CH_3$, $-CH_2-O-CH_3$, $-CH_2-O-CH_2-CH_3$, $-CH_2-O-CH-(CH_3)_2$, and -phenyl group;

$R_2$ represents at least one group selected from the group consisting of H, $-CH_3$, $-OCONH-(CH_2)_3-CH_3$, $-OCONH-C_{18}H_{37}$, and $-COCH_3$;

n represents an apparent degree of polymerization of a polyalkylene oxide chain or a derivative thereof added to the cyclic molecule, and the value of n ranges from 1.1 to 10.0:

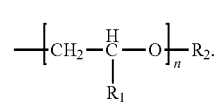

4. The material according to claim 3, further comprising a substance other than the polyrotaxane, wherein the substance and a part of the polyrotaxane are directly or indirectly bound to each other.

* * * * *